United States Patent
Forman et al.

(10) Patent No.: US 8,719,201 B2
(45) Date of Patent: May 6, 2014

(54) MAKING A RECOMMENDATION TO A USER THAT IS CURRENTLY GENERATING EVENTS BASED ON A SUBSET OF HISTORICAL EVENT DATA

(75) Inventors: George Forman, Port Orchard, WA (US); Shyam Sundar Rajaram, San Francisco, CA (US); Martin Scholz, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 229 days.

(21) Appl. No.: 13/269,470

(22) Filed: Oct. 7, 2011

(65) Prior Publication Data

US 2013/0091088 A1 Apr. 11, 2013

(51) Int. Cl.
*G06N 5/00* (2006.01)
*G06F 17/00* (2006.01)
*G06N 99/00* (2010.01)

(52) U.S. Cl.
CPC .................................. *G06N 99/005* (2013.01)
USPC ............................................ 706/45; 707/767

(58) Field of Classification Search
None
See application file for complete search history.

(56) References Cited

U.S. PATENT DOCUMENTS

| | | | |
|---|---|---|---|
| 7,092,926 B2 | 8/2006 | Cerrato | |
| 2006/0173838 A1* | 8/2006 | Garg et al. | 707/5 |
| 2008/0183664 A1 | 7/2008 | Cancel et al. | |
| 2008/0250026 A1 | 10/2008 | Linden et al. | |
| 2009/0055369 A1* | 2/2009 | Phillips et al. | 707/4 |
| 2009/0300009 A1 | 12/2009 | Rezaei et al. | |
| 2011/0106584 A1 | 5/2011 | Borthwick et al. | |

OTHER PUBLICATIONS

Antonellis, Panagiotis, et al., Algorithms for clustering clicksteam data, IPL—Oct. 29, 2007, 11 pgs.
Bell, Anthony J., et al., An information-maximization approach to blind separation and blind deconvolution, Neural Computation, 7, pp. 1129-1159, 1995 Massachusetts Institute of Technology.
Rajaram, S. et al., Bayesian separation of audio-visual speech sources, Acoustics, Speech, and Signal Processing, May 2004. Proceedings (ICASSP '04), IEEE International Conference, vol. 5, pp. 4.
Rivet, Bertrand, et al., Mixing audiovisual speech processing and blind source separation for the extraction of speech signals from convolutive mixtures, IEEE Transactions on Audio, Speech and Language Processing, vol. 15, No. 1, Jan. 2007, 13 pgs.
Bell et al., An information maximisation approach to blind separation and blind deconvolution, Neural Computation, 1995 (38 pages).
Blei et al., Latent Dirichlet Allocation, Journal of Machine Learning Research 3 (2003) Jan. 2003 (30 pages).

(Continued)

*Primary Examiner* — Alan Chen (57) ABSTRACT

A method and a system of making a recommendation to a user that is currently generating events based on a subset of historical event data are provided. Historical event data, which is segmented into a set of sessions, is received. Each session includes events. The sessions are associated with clusters that represent the users that generated the historical event data. Each of the associated sessions is associated with one cluster and the number of the clusters is the same as the number of the users. A determination as to which cluster is associated with events currently being generated by a current user's behavior is made. The determining does not require identification of the current user. A recommendation is made to the current user based on the cluster that is associated with the events currently being generated.

17 Claims, 4 Drawing Sheets

(56) References Cited

OTHER PUBLICATIONS

Breese et al., Empirical Analysis of Predictive Algorithms for Collaborative Filtering, Microsoft Research, Apr. 1998 (10 pages).

Dempster et al., Maximum Likelihood from Incomplete Data via the EM Algorithm Journal of the Royal Statistical Society, Series B (Methodological), vol. 39, No. 1. (1977), pp. 1-38.

Fei-Fei et al., A Bayesian Hierarchical Model for Learning Natural Scene Categories, Jun. 2005 (8 pages).

Forman, George, BNS Feature Scaling: An Improved Representation over TF-IDF for SVM Text Classification, HP Laboratories, HPL-2007-32R1, Aug. 2008 (9 pages).

Nigam et al., Text Classification from Labeled and Unlabeled Documents using EM, Machine Learning, 2000 (32 pages).

Rajaram et al., Bayesian Separation of Audio-Visual Speech Sources, Oct. 2004 (4 pages).

Rivet et al., IEEE Transactions on Audio, Speech, and Language Processing, vol. 15, No. 1, Mixing Audiovisual Speech Processing and Blind Source Separation for the Extraction of Speech Signals From Convolutive Mixtures, Jan. 2007 (13 pages).

Rosen-Zvi et al., The Author-Topic Model for Authors and Documents, UAI 2004 (8 pages).

Sivic et al., Discovering Objects and Their Location in Images, Carnegie Mellon University, Research Showcase, Robotics Institute School of Computer Science, Jan. 1, 2005 (9 pages).

\* cited by examiner

MAKING A RECOMMENDATION TO A USER THAT IS CURRENTLY GENERATING EVENTS BASED ON A SUBSET OF HISTORICAL EVENT DATA

BACKGROUND

Members of a household frequently share accounts for services, such as Netflix, Amazon, New York Times online, and web browsers. Additionally, the members of a household may share an account for a device that provides services, such as a smart phone, a cable TV, or a touch pad. The activities that the household members engage in while logged into the account may be used to personalize recommendations to a user of the account.

BRIEF DESCRIPTION OF THE DRAWINGS

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "detecting," "determining," "operating," "using," "accessing," "comparing," "associating," "receiving," "transmitting," "communicating," "executing," "storing," "detecting," "sharing," "generating," "recommending," "using," "making," "dividing," "segmenting," "searching," and "modifying data to transform the state of a computer system," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

As discussed herein, when multiple users share an account in the conventional art, the recommendations may not suit the user that is currently active. Therefore, according to one embodiment, the events that are currently being generated by a user are compared to previous events to determine a subset of past events are likely associated with the same user. The selected previous events are used as a part of making a recommendation to the current user. As will become more evident, making a recommendation to a current user based on historical events that were probably generated by the current user will result in recommendations that are better suited for the current user than if the recommendation was based on all past events in the account indiscriminately, including events made by other users of the account.

Historical event data, according to one embodiment, includes information describing events that were generated due to the behavior of a plurality of users. Examples of events include, but are not limited to, web pages selected by one or more users, television shows selected by one or more users, and applications used by one or more users. The events, according to one embodiment, are generated by a plurality of users that are associated, for example, with an organization. Examples of organizations include, but are not limited to, a household, a department within a business, a classroom of a school, a fraternity or a sorority. The users of the organization may be located close to each other or may be located remotely from each other.

Figure 1:
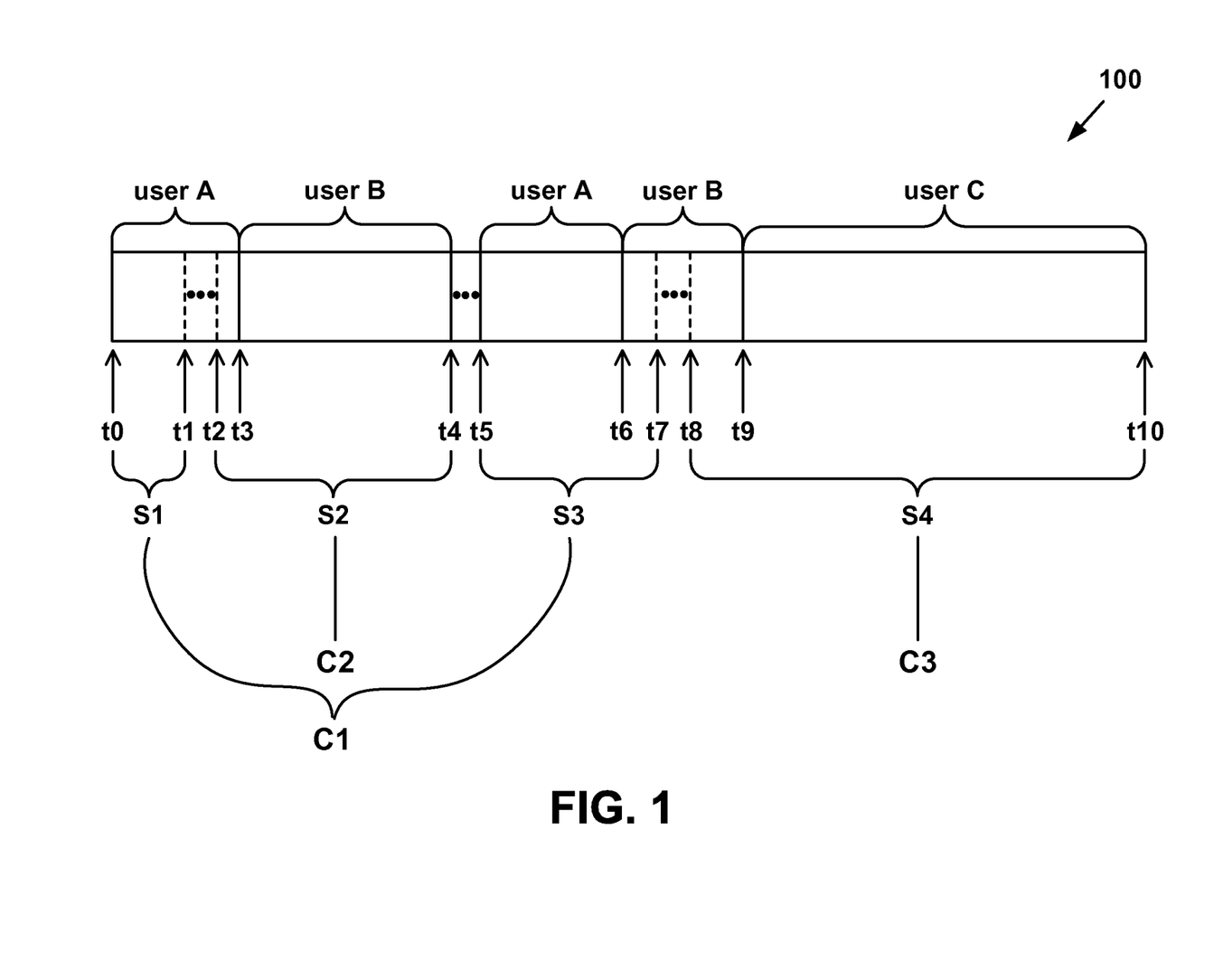
FIG. 1 depicts historical event data that was generated by a plurality of users associated with an organization over a period of time, according to one embodiment.

FIG. 1 depicts historical event data that was generated by a plurality of users associated with an organization over a period of time, according to one embodiment.

For example, the historical event data 100 depicted in FIG. 1 includes event data that has been generated due to the behavior of users A, B, and C over a course of time from time t0 to time t10. As depicted in FIG. 1, user A generated events from time t0 to time t1. No events were generated from time t1 to time t2. Then user A resumed generating events from time t2 to time t3. User B started generating events immediately after user A stopped at time t3 and continued until time t4. None of the users A-C generated events from time t4 to time t5. User A then generated events again from time t5 to time t6. Immediately after user B stopped generating events at time t6, user A started generating events again and continued generating events until time t7. No users generated events from time t7 until time t8. User A resumed generating events at time t8 and continued until time t9. User C generated events as soon as user A stopped generating events at time t9 and continued until time t10.

According to various embodiments, the historical event data 100 is divided into sessions. Various methods can be used for dividing the historical event data into sessions. For example, the historical event data 100 can be divided into sessions based on a specified lapse between web URLs visited, a computer being rebooted, an account or computer being logged out, a screen saver being activated, a device going to sleep, a browser being minimized, user-identified session boundaries, and different sessions. Examples of different sessions include browser processes, windows, selection of different browser tabs, and the separate sessions associated with different devices as recognized, for example, by an internet service provider (ISP).

As depicted in FIG. 1, the historical event data 100 is divided into sessions S1-S4. Session S1 includes historical event data from time t0-t1, session S2 includes event data from time t2 to t4, session S3 includes historical event data from time t5 to time t7, session S4 includes event data from time t8 to time t10.

According to various embodiments, each session is associated with a cluster. For example, as depicted in FIG. 1, sessions S1 and S3 are associated with cluster C1, session S2 is associated with cluster C2, and session S4 is associated with cluster C3. According to one embodiment, session S3 is associated with cluster C1 because the behavior associated with the events of session S1 best fit the events associated with session S3. For example, for the sake of illustration, assume that the behavior exhibited by the events associated with session S2 are sufficiently different from the behavior exhibited by the events associated with session S1, therefore, sessions S1 and S2 are associated respectively with different clusters C1 and C2.

The historical event data 100 associated with each session S1-S4 is an approximation of the event data generated by each user A-C. For example, sessions S1 and S3 are approximations of event data generated by user A, and session S2 is an approximation of event data generated by user B, and session S4 is an approximation of event data generated by user C. The event data of sessions are approximations because they do not include exactly the event data generated by corresponding users. For example, as depicted in FIG. 1, the event data generated by user A from time t2 to t3 is included in session S2. However, according to various embodiments, better estimates of which users generated event data can be made as more event data is collected.

According to one embodiment, each session is associated with a cluster that represents one user of an organization of users, for example, by analyzing the behavior associated with each session. For example, assume that it is known that there are three users that generated the historical event data 100 depicted in FIG. 1. The events associated with each of the sessions can be analyzed to determine that sessions S1 and S3 were generated by one user, session S2 was generated by a second user, and session S4 was generated by a third user. Therefore, as depicted in FIG. 1, sessions S1 and S3 are associated with cluster C1, session S2 is associated with cluster C2, and session S4 is associated with cluster C3.

According to one embodiment, the number of clusters is the same as the number of users in the organization or the number of users sharing an account, among other things. For example, as depicted in FIG. 1, there are three users A-C and there are three clusters C1-C3.

For the sake of illustration, several of the clusters include only one session. However, embodiments are well suited to a cluster including a plurality of sessions based on historical event data 100 that is generated over a period of time. Further, various embodiments do not require the sessions of a cluster to have been generated contiguously with respect to each other in the historical event data 100. For example, sessions S1 and S3 are associated with the cluster C1. However, according to one embodiment, session S1 and session S2 are separated by a period of time from time t1 to time t2.

The historical event data 100 may be stored in any number of locations. The historical event data 100 may be stored on one or more devices that the users A-C interact with. However, the historical event data 100 may be stored remotely from one or more devices that the users A-C interact with.

According to one embodiment, the identification of the users is not required. For example, embodiments do not require knowing that user A is a 45 year old male and user B is a 32 year old female.

Figure 2:
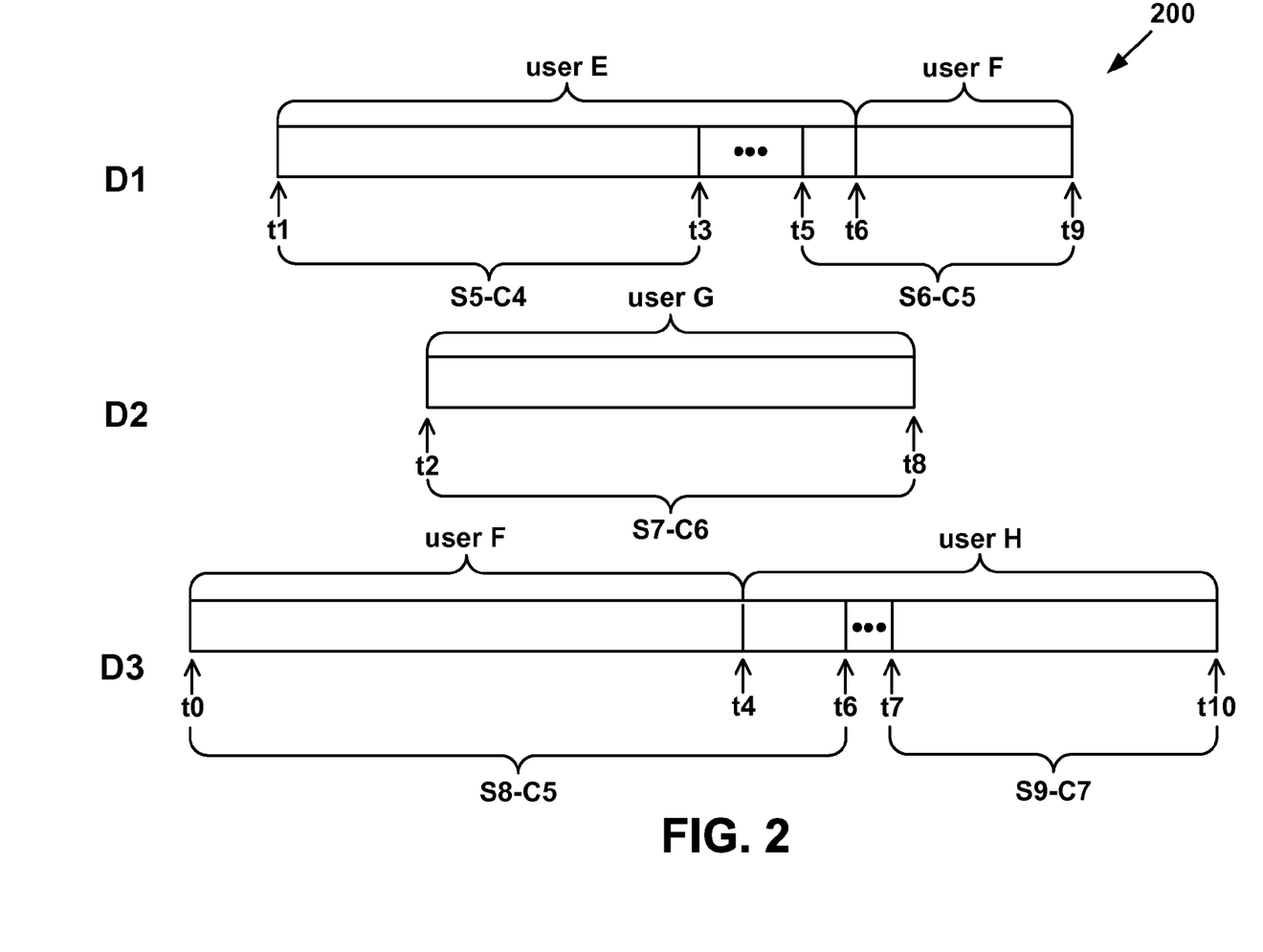
FIG. 2 depicts historical event data that was generated by a plurality of users of an organization over a period of time, according to another embodiment.

FIG. 2 depicts historical event data 200 that was generated by a plurality of users of an organization over a period of time, according to another embodiment. For example, historical event data 200 may be generated concurrently by a plurality of users E-H interacting with a plurality of devices D1-D3. For example, as depicted in FIG. 2, users E-H are generating event data concurrently from times t1 to t9 using devices D1-D3.

As depicted in FIG. 2, user G starts generating events from device D3 at time t0. At time t1, user E starts to generate events at time t1 from device D1 and continues until time t3. There is a lapse in user E's activities from time t3 until time t5. At time t5, user E starts generating events again on device D1 until time t6. Immediately after user E stops generating events at time t6, user F starts generating events on device D1 and continues until time t9.

At time t2, user G starts to generate events from device D2 at time t2 and continues until time t8.

User G generates events on device D3 from time t0 until time t4. User H starts generating events on device D3 immediate after user F stops at time t4 and continues until time t6. There is a lapse in activity on device D3 between time t6 and t7. At time t7, user H starts generating events again on device D3 and continues until time t10.

As depicted in FIG. 2, session S5 is associated with cluster C4, sessions S6 and S8 are associated with cluster C5, session S7 is associated with cluster C6 and session S9 is associated with C7.

According to one embodiment, the event data generated by a plurality of users A-C and E-H (FIGS. 1 and 2) is detected by an entity and used to create historical event data. For example, the entity that detects the event data generated by the users may be a centrally located entity, such as an internet service provider (ISP). In another example, the entity that detects the event data may reside on the device that one or more users is interacting with.

According to one embodiment, when users are concurrently generating events, the order that the detecting entity receives events generated by the different users may be interleaved. For example, referring to FIG. 2, the detecting entity may receive events from users in an order such as FFE-FEEFGGEF . . . EEGHGHFFHHFF where the letters in this example indicate the users that the events were generated from.

According to one embodiment, a session is associated with a cluster, for example, where there is the same number of clusters as there are number of people in the organization. Various methods of associating sessions with clusters can be used. Examples of associating sessions with clusters include, but are not limited to, a demographer method, a CutCost method, and a Mixture Method.

According to one embodiment, demographic information of each user in an organization and demographic information for events is used in the demographer method. For example, referring to FIG. 1, assume for the sake of illustration that the events are universal resource locators (URLs) that the users A-C have selected and that cluster C1 is associated with user A. Each user A-C can be scored according to their demographics, such as their age, gender, or both, among other things. The users' demographics can be obtained, for example, by having the users fill out fields in a user interface. The user scores can be averages or be products of scores, among other things.

Information describing the demographic distribution of the users that visit the URLs can also be obtained. An example of a demographic distribution is that 54 percent of the people that visit a web site are men and the average age is 45. As is well known, there are many well known sources of demographic information. A couple of examples are alexa.com and nielsen.com. If the demographic distribution for a URL is not known, that URL can be excluded from the analysis. A session score can be determined, for example, based on the demographics associated with the URLs for that session.

According to one embodiment, probabilistic scoring is used. For example, a session can be assigned to a cluster for the user whose demographic information best fits the demographic information of the URLs associated with the session. A user's demographics can be received by a per-site model for each of the web sites in a session, and an average or a product of scores can be determined. More specifically, if the session demographic score based on the URLs for session S1 best fits the user A's demographic score, then session S1 can be assigned to a cluster C1 for user A, according to one embodiment. When all of the users have been scored, the whole session can be assigned to a user's cluster with the greater score, according to one embodiment.

According to one embodiment, labeled training examples where the identity of the user that visited some individual web sites during the training is known can be used. For example, if labeled training examples are available, this information can be used to override decisions made based on determining scores of events, users, sessions, as described herein. For example, if a labeled training example is available that reveals that it was the 45 year old female who visited a web site "obscure.com" at a particular date, then that user's score for that site can be set to 1.0 instead of a lower score determined using probabilistic scoring, and likewise, according to one embodiment the session containing that labeled example could be unequivocally assigned to that user.

Although age and gender were used as examples of demographics in various illustrations, embodiments are well suited to other types of demographics such as socio-economic status, education, occupation, or working status, or a combination thereof.

In another embodiment, a CutCost method is used as a part of associating sessions with clusters. According to one embodiment, the CutCost method uses a heuristic search algorithm that involves a cost function. Various embodiments are well suited to many different heuristic search algorithms, such as random search, best-fit search, beam search, genetic algorithm search, among others.

According to one embodiment, two cost components are mixed together to generate the cost function used by the heuristic search algorithm. One cost component, according to one embodiment, pertains to violating a sub-method's prediction of which user to assign a session. An example of a sub-method is a demographer that provides a prediction. For example, if a demographer sub-method predicts that the session belongs to a man, there is some cost associated with assigning it to a woman instead. The other cost component, according to one embodiment, pertains to assigning the sessions in such a way that indicates a particular web site is visited by more than one user within the organization or sharing an account, among other things. For example, if there is an event that rarely occurs, such as visiting an obscure website, there is some cost for assuming that more than one user visits this website versus assuming that only one user engaged in this website. More generally, assigning sessions such that an obscure event is assigned in different sessions to each of the users in the organization is less favorable than session assignments where that obscure event is always assigned to a single one of the users, according to one embodiment.

Although various embodiments are described in the context of a cost function where two cost components are mixed together, various embodiments are well suited to a cost function that is based on one cost component or more than two cost components.

According to one embodiment, each session is assigned to a cluster, and each cluster is assigned to a user. Therefore, according to one embodiment, each session is assigned to a user. In this case, to continue illustration of the CutCost method, initially, the CutCost method can start by randomly assigning sessions to users, in one embodiment. Then the CutCost method can use the aggregation of the two cost components into a single cost function and the heuristic search function to improve the assignments over time. As the search progresses, the various assignments of sessions to users can be fed into the cost function, which scores the assignment. The set of possible assignment combinations of sessions to users is referred to as a "search space," according to one embodiment. The cost function can be used to direct the search in the search space for the better assignment combinations.

According to one embodiment, labeled training data can be used as a part of the CutCost method. For example, if during training it was determined that users A and B both engage in an obscure event Y, there may be no cost for assigning sessions that include the obscure event Y to both of the users A and B.

In one embodiment, the rarity of performing an event is taken into account. For example, little cost may be associated with session assignments that ascribe visits to a common web site, such as "google.com" to multiple users. Therefore, according to one embodiment, a higher cost is associated with session assignments that ascribe an obscure event to multiple users, but a lower cost is associated with session assignments that ascribe a common event to multiple users.

In another embodiment, a mixture method is used as a part of associating sessions with clusters. According to one embodiment, the mixture method is a probabilistic method that uses a virtual coin and multiple virtual dice. For example, the virtual coin can be weighted coin with sides that represent users in the organization. The coin can include the same number of sides as there are users in the organization. The coin can be weighted, for example, based on the level of activity for each of the users, according to one embodiment.

Although the sides of the coin represent users, the identity of the users is not required. For example, various embodiments do not require knowing that user A is a 45 year old man, user B is a 34 year old female, and user C is a 16 year old boy. According to one embodiment, it is sufficient for the mixture method to know that there are three users.

Further, according to one embodiment, the virtual dice is an n-sided dice that represents all the possible events in the universe. In this case, n can be the number of possible events in the universe. There are as many dice as there are sides in the coin and there is a 1-to-1 association between coin sides and the number of dice, according to one embodiment.

The probability that a user engaged in a particular event can be determined, according to one embodiment, by flipping the coin to determine a user and rolling the associated dice to determine events that the user engaged in. Further, according to one embodiment, the dice is rolled the same number of times as there are events in a session. More specifically, assume that there is a session with 100 events in it. Also assume that user X was selected by the flipping of the coin. Then the associated dice is rolled 100 times to determine the events that user X engaged.

According to one embodiment, the mixture method provides a soft assignment of sessions to users that maximize likelihood. According to one embodiment, two distributions are used. The first distribution pertaining to the coin, which shall be represented by p(user), captures the relative differences in the amount of a particular type of event, such as browsing, done by the different users of the organization. For example, a value of 0.8 for p(user=Alice) would indicate that 80% of the sessions belong to Alice.

The second distribution pertaining to the dice, which shall be represented by p(website|user), captures the activity preferences of the different users. For example, continuing the example of Alice being the user and the event being web browsing, p(website=domain.com|user=Alice) would indicate how likely it is that the website visited by Alice is domain.com.

According to one embodiment, there are two phases in the mixture method. The first phase is a learning phase and the second phase is a testing phase. During the learning phase, an unlabeled set of sessions is received and an Expectation Maximization (EM) algorithm can be used to learn the probability distributions using the coin and the dice, as described herein. The output of the learning phase, apart from the distributions, is a soft labeling of sessions to users. The maximum of these membership probabilities for a particular session can be used to assign a session to a cluster, for example, without knowing which users are associated with the clusters, according to one embodiment. The EM algorithm is an iterative algorithm that involves the E-step and the M-step.

According to one embodiment, demographic information about the users can be used to determine the identities of the users. Determining the identities of the users for the clusters is referred to as "labeling the clusters." The demographic information can be determined, for example, by having the users provide the information, monitoring if the users engage in an activity that provides positive identity, such as logging into an account, such as a Skype account, or going to a Facebook web page that belongs to that user. Demographic information can be used, according to one embodiment, as a part of the demographer method, the CutCost method, or the Mixture Method.

The testing phase involves using the distributions that were learned during the learning phase to label clusters with identified users that were not included in the learning phase, according to one embodiment. The testing phase is similar to the learning phase except that only the E-step of the EM algorithm is performed once, according to one embodiment.

Although identifying information of users may be used by various embodiments, the identifying information of users is not required for various embodiments. According to one embodiment, additional information, for example, in the form of labeled clusters or demographics of users, or a combination thereof, can be taken into account by initializing the two probability distributions that result from the coin and the dice. For example, assume that it is known that one of the users is a 20 year old female; when analyzing the sessions of her organization, this information can be used to initialize the event preference, such as web site preference, for that user based on the browsing behavior of females in that age group in the overall population.

Labeled clusters can be explicitly taken into account in the E-step of the EM algorithm where the membership of clusters to users is estimated and in the case of labeled clusters, the membership is determined by the labels and, according to one embodiment, not varied.

According to one embodiment, a session in the historical event data is associated with one cluster. For example, referring to FIG. 1, each of the sessions S1-S4 is associated with only one of the clusters C1-C3.

As discussed herein, various embodiments do not require identifying the users in order to associate sessions with clusters that represent users. However, according to various embodiments, additional information can be used to determine the identity of users associated with the clusters. Examples of additional information include, but are not limited to, demographic information and information obtained during labeled training. Examples of demographic information of the users include, but are not limited to, age, gender, education, occupation, or working status, or a combination thereof. Examples of labeled training information include but are not limited to a specific activity which is known to belong to a specific user. More specifically, this could be from having the system explicitly ask which user is currently active. In this case, the system could ask the users for the first x number of sessions and, thereafter, ask only occasionally, according to one embodiment. Another example of labeled training information is having specific activities linked with users. More specifically, a user may be explicitly connected to a certain event, such as a Facebook login or a bank account login.

According to one embodiment, a session is assigned to a cluster, and a cluster is assigned to a user, for example, when some demographic information about the user has been determined as discussed herein. Therefore, according to various embodiments, a session is assigned to a user. For example, a session can be assigned to a user as a part of the CutCost method, according to one embodiment. According to one embodiment, the mixture method does not require identification of the user. However, according to one embodiment, a session can be assigned to a user, for example, as an additional operation to the mixture method.

According to one embodiment, a determination is made as to which cluster is associated with a current user. For example, assume that a user is currently engaging in behavior that generates events. That user's current behavior can be analyzed and used to select a cluster that would best fit the user's current behavior. For example, if the current user is engaging in activities that best fit the events associated with cluster C2 (FIG. 1), then, according to one embodiment, a determination will be that cluster C2 includes historical event data that was generated by the current user.

A known-manner recommendation algorithm can be used to make a recommendation to the current user based on an analysis of the cluster associated with that current user. Examples of known-manner recommendation algorithms include, but are not limited to, most recently used, most frequently used, and user-based or item-based collaborative filtering algorithms. For example, if it was determined that the most likely cluster that includes historical event data for the current user is cluster C2 (FIG. 1), the recommendation algorithm will use the events in cluster C2 to make a recommendation to the current user.

Figure 3:
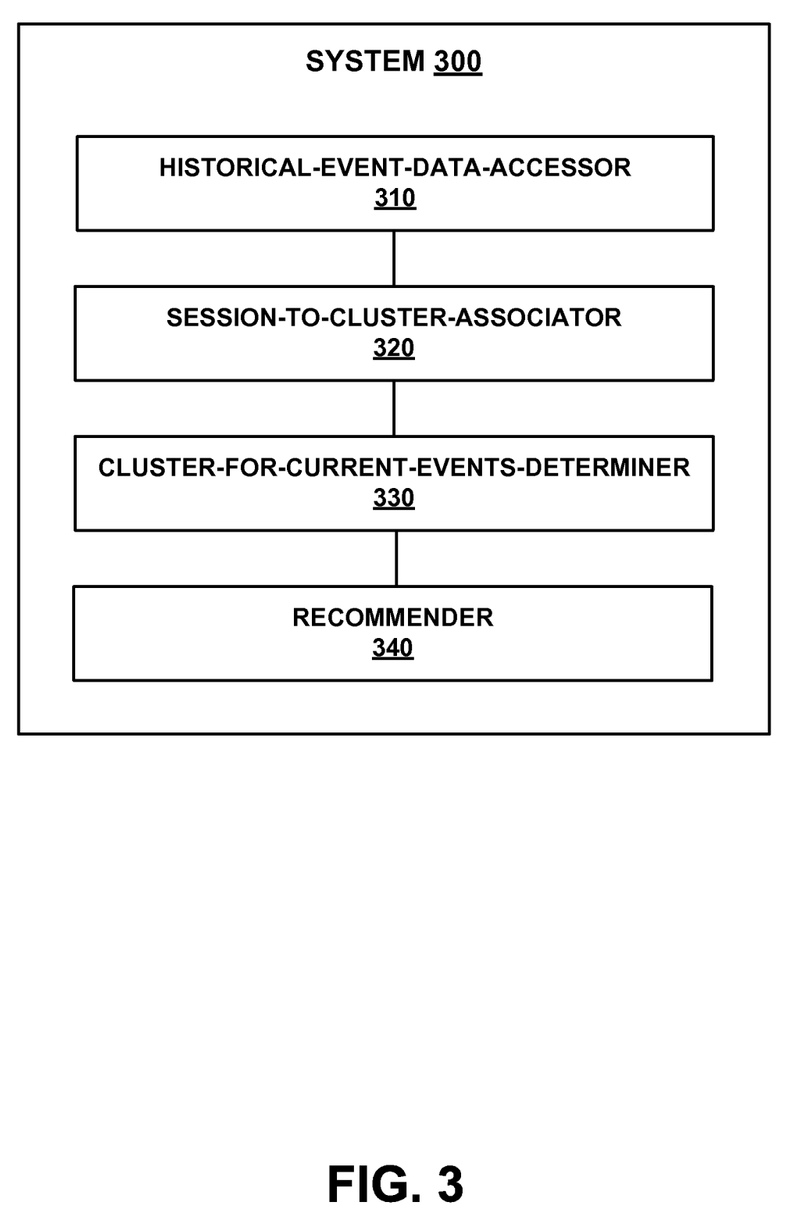
FIG. 3 depicts a block diagram of a system of making a recommendation to a current user that is currently generating events based on a subset historical event data, according to one embodiment.

FIG. 3 depicts a block diagram of a system 300 of making a recommendation to a current user that is currently generating events based on a subset historical event data, according to one embodiment.

The blocks that represent features in FIG. 3 can be arranged differently than as illustrated, and can implement additional or fewer features than what are described herein. Further, the features represented by the blocks in FIG. 3 can be combined in various ways. The system 300 can be implemented using hardware, hardware and software, hardware and firmware, or a combination thereof.

The system includes a historical-event-data-accessor 310, a session-to-cluster-associator 320, a cluster-for-current-events-determiner 330, and a recommender 340. The historical-event-data-accessor 310 is configured for accessing historical event data that is segmented into a set of sessions. According to one embodiment, each session includes a plurality of events. The session-to-cluster-associator 320 is configured for associating the sessions with clusters that represent the users that generated the historical event data. According to one embodiment, each of the associated sessions is associated with one cluster and the number of the clusters is the same as the number of the users. The cluster-for-current-events-determiner 330 is configured for determining which cluster is associated with events currently being generated by a current user's behavior. According to one embodiment, the determining does not require identification of the current user. The recommender 340 is configured for making a recommendation to the current user based on the cluster that is associated with the events currently being generated.

Figure 4:
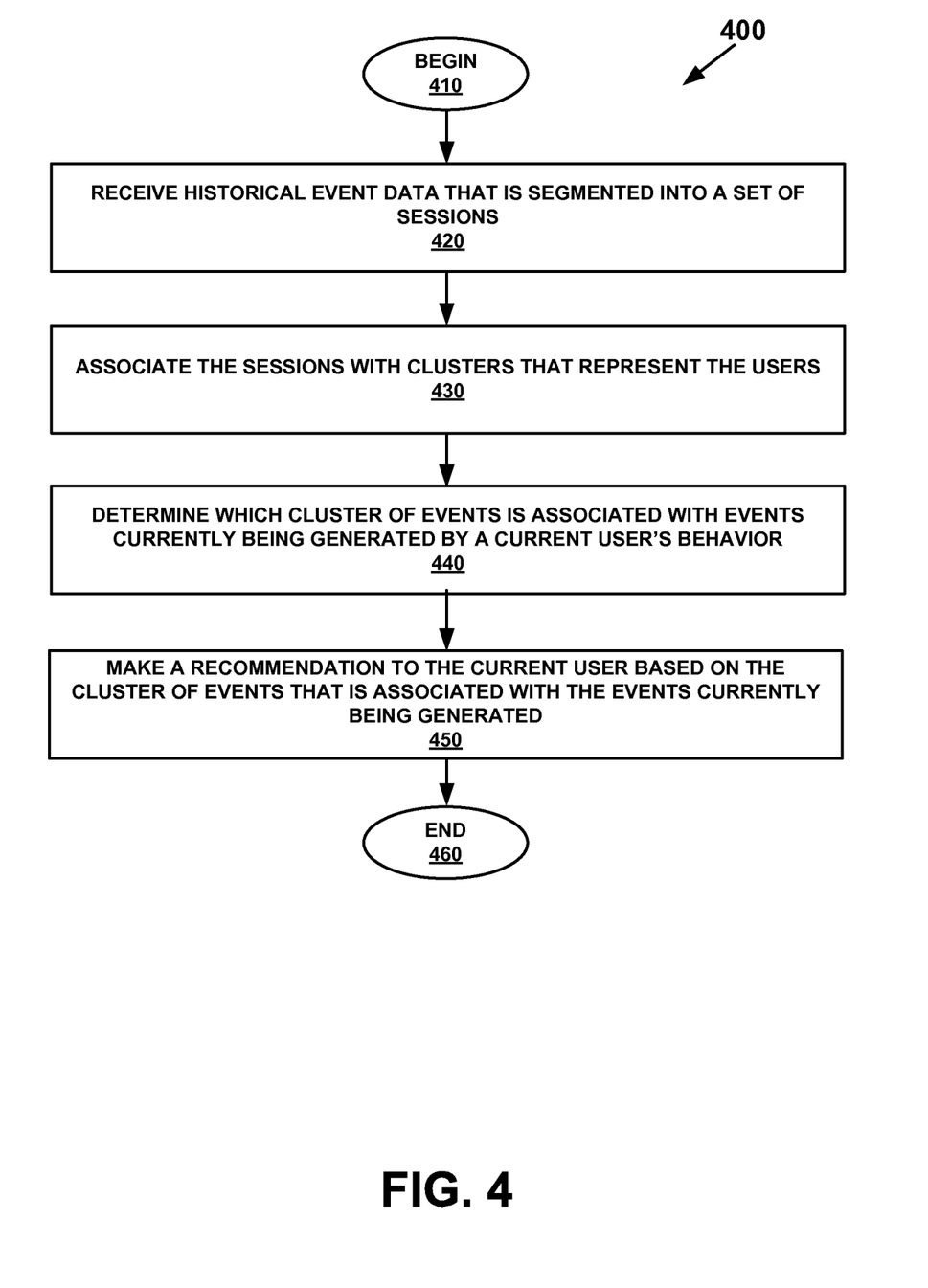
FIG. 4 depicts a flowchart for a method of making a recommendation to a current user that is currently generating events based on a subset historical event data, according to one embodiment.

FIG. 4 depicts a flowchart 400 for a method of making a recommendation to a current user that is currently generating events based on a subset historical event data, according to one embodiment.

Although specific operations are disclosed in flowchart 400, such operations are exemplary. That is, embodiments of the present invention are well suited to performing various other operations or variations of the operations recited in flowchart 400. It is appreciated that the operations in flowchart 400 may be performed in an order different than presented, and that not all of the operations in flowchart 400 may be performed.

For the purpose of illustration, the description of the flowchart 400 shall refer to FIG. 1.

At 410, the method begins.

At 420, historical event data that is segmented into a set of sessions is received. For example, various methods can be used for dividing the historical event data 100 (FIG. 1) into the sessions S1-S4. For the purpose of illustration, assume that the historical event data 100 is divided into sessions S1-S4 based on a specified lapse between keystrokes.

According to one embodiment, each session includes a plurality of events. For example, the sessions S1-S4 each include a plurality of events.

At 430, the sessions are associated with clusters that represent the users that generated the historical event data. For example, each of the sessions is associated with one cluster, according to one embodiment. The number of the clusters is the same as the number of the users, according to one embodiment.

Further, in this illustration there are three users A-C that generated the historical event data 100 and there are three clusters C1-C3 depicted in FIG. 1. Sessions S1 and S3 are associated only with cluster C1, session S2 is associated only with C2, and session S4 is associated only with C3. The number of users may be the number of users in an organization or the number of users sharing an account, among other things. According to one embodiment, the number of users is received as an input.

Various methods can be used for associating the sessions with the clusters such as the demographer method, the Cut-Cost method or the Mixture Method, as discussed herein.

At 440, a determination is made as to which cluster is associated with events currently being generated by a current user's behavior. For example, assume that a user is currently engaging in behavior that generates events. If the current user is engaging in activities that are associated with cluster C2, for example, then, according to one embodiment, the determination will be that cluster C2 includes historical event data that was generated by the current user.

According to one embodiment, the determination does not require identification of the current user. For example, the learning phase of an EM algorithm used as a part of a Mixture Method as described herein can be used to associate sessions with clusters, without identifying the users.

According to one embodiment, offline processing can be used as a part of performing 420-440.

At 450, a recommendation is made to the current user based on the cluster that is associated the events currently being generated. For example, if it was determined that the cluster C2 is associated with the events currently being generated, the recommendation algorithm will use the events in cluster C2 to make a recommendation to the current user. The recommendation algorithm can be used to make a recommendation to the current user based on an analysis of the cluster C2 associated with that current user. Examples of recommendation algorithms include, but are not limited to, most recently used, most frequently used, and user-based or item-based collaborative filtering algorithms.

As can be seen, making a recommendation to a current user that is probably user C based on cluster C2 will result in recommendations that are better suited for the current user than if the recommendation was based on events generated by a plurality of users indiscriminately without attempting to approximate which events were generated by the current user.

According to one embodiment, online processing can be used as a part of performing 450.

At 460, the method ends.

The above illustration is only provided by way of example and not by way of limitation. There are other ways of performing the method described by flowchart 400.

Various embodiments provide for modifying data to transform the state of a computer system, for example, by associating sessions with clusters and making recommendations, among other things.

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present invention. According to one embodiment, the non-transitory computer readable storage medium is tangible.

Various embodiments provide for segregating events of the users into separate profiles for the users and making recommendations, also known as "personalizations," based on the user that is currently active rather than a conglomeration of all users that share an entity, such as an account or device, among other things.

According to various embodiments, an account or a login is not required. An account or login may or may not be used as a part of various embodiments.

According to one embodiment, the users are not required to use the same device. The users may or may not use the same device.

According to one embodiment, the events associated with the historical event data are not required to have occurred sequentially in time. The events may or may not have occurred sequentially in time.

According to one embodiment, the sessions are not required to be contiguous with respect to each other in the historical event data. For example, at least two of the sessions may be interleaved as depicted in FIG. 2.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of making a recommendation to a current user, the method performed by a computer system and comprising:
   receiving historical event data that is segmented into sessions, wherein each session includes events;
   associating the sessions with clusters that represent users that generated the historical event data, wherein each session is associated with one cluster and a number of the clusters is the same as a number of the users;
   determining which of the clusters is associated with events currently being generated by the current user's behavior, wherein the determining does not require identification of the current user, and the determining comprises comparing the currently generated events with events of the respective clusters, and identifying, based on the comparing, one of the clusters that includes events that fit the currently generated events; and
   making a recommendation to the current user based on the determined cluster.

2. The method as recited by claim 1, wherein the associating of the sessions with the clusters comprises:
   using a demographer method to associate the sessions with the clusters based on demographics associated with the users and demographics associated with the events.

3. The method as recited by claim 1, wherein the associating of the sessions with the clusters comprises:
   using a method to associate the sessions with the clusters based on a cost function.

4. The method of claim 1, wherein receiving the historical event data comprises receiving at least one from among user-selected web pages, user-selected television shows, and user-selected applications.

5. The method of claim 1, wherein a first of the clusters includes plural ones of the sessions.

6. The method of claim 1, wherein a first of the sessions includes event data for multiple users.

7. A method of making a recommendation to a current user, the method performed by a computer system and comprising:
   receiving historical event data that is segmented into sessions, wherein each session includes events;
   associating the sessions with clusters that represent users that generated the historical event data, wherein each session is associated with one cluster and a number of the clusters is the same as a number of the users, wherein the associating of the sessions with the clusters comprises using a mixture method to associate the sessions with the clusters where a virtual coin represents an uncertainty involved in assigning users to sessions and each of multiple virtual dice represents an uncertainty involved in assigning an event in a session to a user, wherein a number of the virtual dice and a number of sides of the virtual coin is the same as the number of the users;
   determining which cluster is associated with events currently being generated by the current user's behavior, wherein the determining does not require identification of the current user; and
   making a recommendation to the current user based on the determined cluster.

8. The method as recited by claim 7,
   wherein the sessions associated with a particular one of the clusters are not required to be contiguous with respect to each other in the historical event data.

9. A system of making a recommendation to a current user, the system comprising:
   at least one processor configured to:
   access historical event data that is segmented into a set of sessions, wherein each session includes events;
   associate the sessions with clusters that represent users that generated the historical event data, wherein each of the sessions is associated with one cluster and a number of the clusters is the same as a number of the users, and the session-to-cluster-associator is configured to further search a search space that includes a set of possible assignment combinations of sessions to the users based on a cost function, wherein the cost function uses a first cost component related to violation of a prediction of which of the users to assign one of the sessions, and a second cost component for assigning the one of the sessions to more than one of the users to determine what assignment combinations are better;
   determine which cluster is associated with events currently being generated by the current user's behavior, wherein the determining does not require identification of the current user; and
   make a recommendation to the current user based on the determined cluster.

10. The system of claim 9, wherein an identity of at least one of the users is known and wherein the at least one processor is further configured to use the known identity of the at least one user as a part of associating a session with a cluster for the at least one user.

11. A non-transitory computer readable storage medium storing computer-executable instructions for making a recommendation to a current user, the instructions upon execution causing a computer system to:
   receive historical event data that is segmented into sessions, wherein each session includes events;
   associate the sessions with clusters that represent users that generated the historical event data, wherein each of the associated sessions is associated with one cluster and a number of the clusters is the same as a number of the users;

determine which of the clusters is associated with events currently being generated by the current user's behavior, wherein the determining does not require identification of the current user, and the determining comprises comparing the currently generated events with events of the respective clusters, and identifying, based on the comparing, one of the clusters that includes events that best fit the currently generated events; and make a recommendation to the current user based on the determined cluster.

12. The non-transitory computer readable storage medium of claim 11, wherein the associating of the sessions with the clusters further comprises:

using a demographer method to associate the sessions with the clusters based on demographics associated with the users and demographics associated with events of one of the sessions.

13. The non-transitory computer readable storage medium of claim 11, wherein the associating of the sessions with the clusters further comprises:

using a CutCost method to associate the sessions with the clusters based on a cost function.

14. The non-transitory computer readable storage medium of claim 11, wherein receiving the historical event data comprises receiving at least one from among user-selected web pages, user-selected television shows, and user-selected applications.

15. The non-transitory computer readable storage medium of claim 11, wherein a first of the clusters includes plural ones of the sessions.

16. The non-transitory computer readable storage medium of claim 11, wherein a first of the sessions includes event data for multiple users.

17. A non-transitory computer readable storage medium storing computer-executable instructions for making a recommendation to a current user, the instructions upon execution causing a computer system to:

receive historical event data that is segmented into sessions, wherein each session includes events;

associate the sessions with clusters that represent users that generated the historical event data, wherein each of the associated sessions is associated with one cluster and a number of the clusters is the same as a number of the users, wherein the associating of the sessions with the clusters comprises using a mixture method to associate the sessions with the clusters where a virtual coin represents an uncertainty involved in assigning users to sessions and each of multiple virtual dice represents an uncertainty involved in assigning an event in a session to a user, wherein a number of the virtual dice and a number of sides of the virtual coin is the same as the number of the users;

determine which cluster is associated with events currently being generated by a current user's behavior, wherein the determining does not require identification of the current user; and make a recommendation to the current user based on the determined cluster.

* * * * *

UNITED STATES PATENT AND TRADEMARK OFFICE
CERTIFICATE OF CORRECTION

PATENT NO. : 8,719,201 B2  
APPLICATION NO. : 13/269470  
DATED : May 6, 2014  
INVENTOR(S) : George Forman et al.

Page 1 of 1

It is certified that error appears in the above-identified patent and that said Letters Patent is hereby corrected as shown below:

In the Claims

In column 12, line 34, in Claim 9, after "into" delete "a set of".

Signed and Sealed this
Twelfth Day of August, 2014

Michelle K. Lee
*Deputy Director of the United States Patent and Trademark Office*